(No Model.)
L. H. NASH.
PROPORTIONAL WATER METER.
No. 336,148. Patented Feb. 16, 1886.
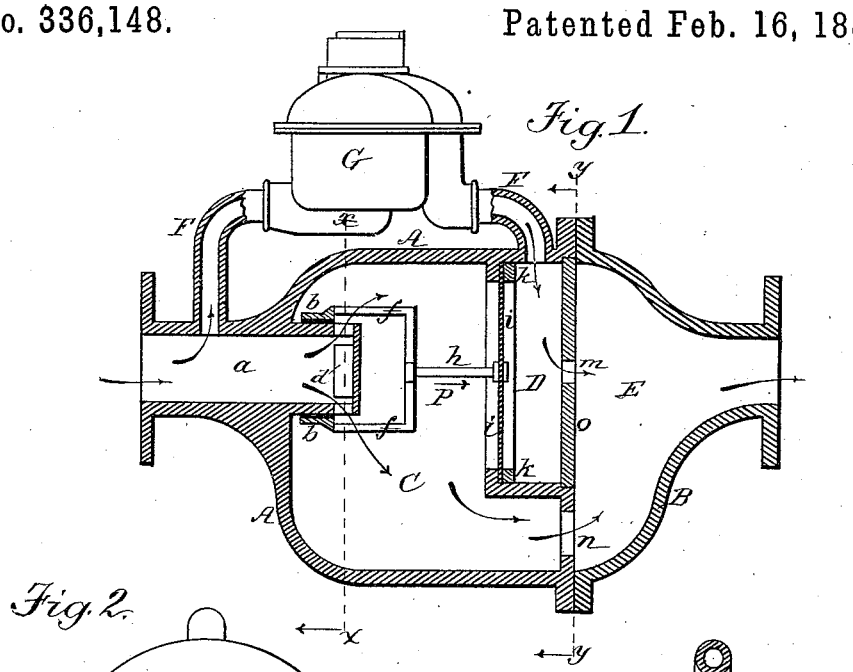
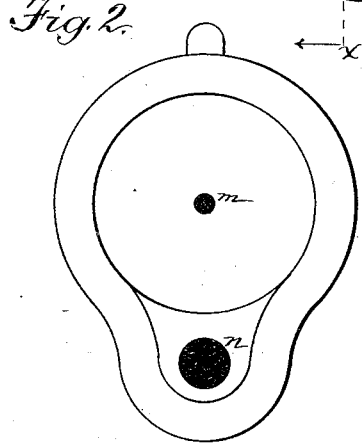
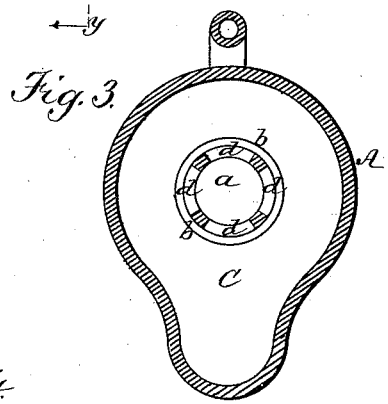
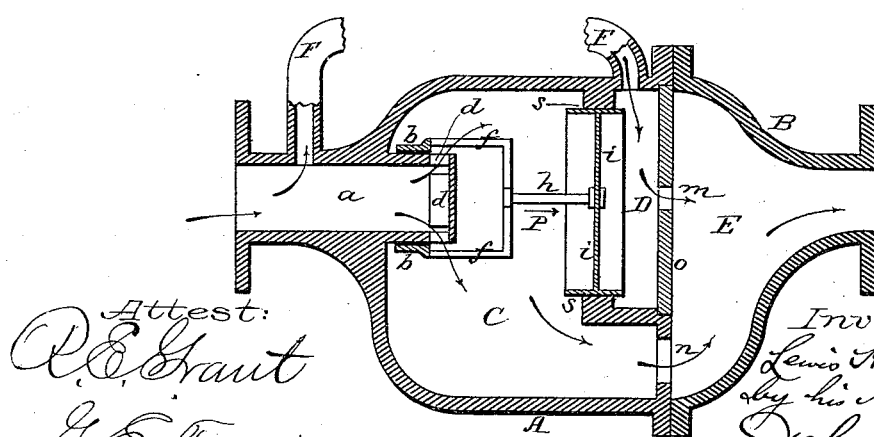
Attest:
R. E. Grant
G. E. Tucker
Inventor:
Lewis Hallock Nash
by his Attorneys
Johnson & Johnson

United States Patent Office.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 336,148, dated February 16, 1886.

Application filed April 13, 1885. Renewed December 9, 1885. Serial No. 185,170. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

The subject-matter of this application is the apparatus or device for carrying out a method of measuring water flowing in two separate and distinct streams under conditions in which, while only one of said streams are measured, the resistance to the flow of both streams will be equalized under all conditions of the flow to make the pressure in both equal.

For a full understanding of the invention herein claimed, I will state that meters have been constructed to effect a division of the passing volume of the water into two separate volumes, in which only one of the volumes is passed through a metered passage, so that its measurement should indicate the entire quantity of water which may pass to the service-pipe in both volumes. In such division of flowing body of the water the proportionate volumes of the two separate streams are so regulated that they will bear the same relation to each other and to the entire quantity of water that enters the meter, so that the division or portion which enters and passes through the metered passage should represent a given and definite proportion of the entire volume, and the indication it produces should be the record of measurement of the whole passing volume. So far as I know and can find, such division and proportionate regulation of the separate currents has been effected by valves operated by the direct action of the water to control the area of the division-passages of the meter to the proportionate quantity of water passing through them, and the force used to regulate the delivery of the water and to open the valve-ports proportionately is the whole of the moving stream entering the meter. The accomplishment of this result is not sufficient to effect and determine a proper measurement of the water passing through two separate passages or chambers of entirely different character without provision for regulating the resistance in the two separate chambers or passages to make the pressure in both equal.

My invention embraces a device of novel construction and combinations for measuring water in divided streams, in which the principle controlling the action of the device is the law that if water flows from a chamber having a uniform pressure into another chamber having a different uniform pressure, through two or more orifices, the quantity of water discharged through each orifice will be proportionate to its hydraulic capacity or size, and the flow from said chambers into a chamber common to both will be with a uniform pressure—that is to say, water flowing from two chambers having the same pressure into one common chamber the conditions as to pressure in all are the same—and it is obvious that such conditions are vital to obtain from one stream of a divided volume of water an accurate and proper measurement and indication of the combined volumes of both streams. In carrying out this method I lead each of the divided streams into separate chambers having provision for controlling the pressure, so that it will always be the same in each, and then depend upon the outlet-orifices to deliver from each a proper proportionate quantity of water. In this operation it makes no difference what may be the resistance in the "meter" communicating chamber, for whatever it is the resistance-controlling device will open, so as to cause exactly the same degree of resistance to the water entering the other chamber, to the end that the flow of water through orifices of a given but unequal area under the same conditions of pressure will cause a definite resistance to the flow of the water in the main chamber, which, in fact, thereby constitutes the measuring device, while the metered chamber forms the indicating device.

The two chambers which I have described as giving the same resistance to the flow of water through them are separated from each other by a movable or flexible partition, so that the pressure therein shall always be the same, and the outlet-orifices from these chambers open into a common passage or chamber, so that the pressure is always equal in all parts, and therefore the quantity of water discharged from each chamber will be proportionate to the sizes of such orifices. The pressure in these two receiving-chambers is always maintained in equal degrees by a valve for one or both of the supply-passages, connected with and controlled by a movable or flexible partition, so that if one of these chambers is too freely supplied with water the pressure in the chamber will thereby become unequal, and moving the partition will move also the valve, so as to partially close the supply to such chamber, and thus preserve the rate of flow from the two chambers.

The accompanying drawings illustrate my said water-measuring device as applied to an indicating device known as a "meter," in which—

Figure 1 represents a vertical longitudinal section, the working device being in elevation; Fig. 2, a cross-section taken on the line $y\ y$ of Fig. 1, showing the discharge-orifices from the separate chambers; Fig. 3, a cross-section taken on the line $x\ x$ of Fig. 1, showing the valved inlet to the main chamber; and Fig. 4 represents a vertical section of the measuring device with a modification of its movable chamber-division.

My improved measuring device is not confined in its application to any particular construction of working devices for operating the indicating mechanism, which is arranged in what is known as the "meter," the inclosing case G of which I have shown in elevation as connecting with the inlet-pipe.

The measuring device proper consists of a shell, A, formed, like pipe-fittings, independent of the meter-case G, and divided into two chambers, C and D, which communicate with an end chamber, E, which forms the discharge-passage through the cover B, which connects with the service-pipe. Both chambers C and D communicate with the inlet $a$ and with the outlet E by different passages. The division of the chambers C and D is formed by a flexible diaphragm, $i$, as in Fig. 1, or by a piston-head partition, as in Fig. 4, either being caused to move only when the pressure in one chamber is greater than that in the other. Such movable division preferably stands at right angles to and in the line of the inlet-passage $a$, and is connected with and controls a valve which controls the supply of the water into the chamber C from the pipe $a$, as will be presently explained. Preferably, the chambers C and D are of unequal area, and the chamber D is formed by and between the said movable division and the end plate, $o$, so as to allow the chamber C to communicate with the discharge-chamber E at one side of the said chamber D, which communicates with the working-chamber of the device, which latter communicates with the inlet-passage $a$ by a pipe, F, so that the volume of the water is divided at the inlet-passage. The inlet-pipe extends into the chamber C and terminates in valve-ports $d\ d$, opening therein, which are controlled by a ring-valve, $b$, which is connected with the movable diaphragm $i$ by the rods $f$ and central rod, $h$. When a flexible partition is used, it is seated in that side of the chamber D which it closes, and is held by a ring, $k$, or otherwise. The outlet-orifices of the chambers C and D are formed in the end plate, $o$, at $m\ n$, the sum of the area of which may be equal to that of the inlet-passage $a$, and may be of any size not too large for effective action.

In place of the single orifices shown, a number of smaller ones may be used, their combined area having the same action as the single ones; or any desired form of orifice may be used. When the chamber-division $i$ is made like a piston-head, it is fitted to slide between seats $s$, just as a piston slides upon the walls of a cylinder. I prefer to make the shell A depart from a cylindrical form, to provide a water-passage from the chamber C at the side of the chamber D.

The operation of the measuring device is as follows: Water entering the passage $a$ from the street-main is divided into two streams, one passing through the pipe F into the working-chamber of the indicating device, to operate the latter, and thence into the chamber D, and the other stream passing through the ports $d\ d$ into the chamber C. From these chambers the water passes under equal pressure into the discharge-chamber E, whence it passes into the service-pipe. With this arrangement of receiving and controlling valves, the interposition of the movable partition to control said valve to equalize the pressure of the separate moving volumes of water is of primary importance, since it will move under the slightest change in the pressure in either chamber. As the flow in chamber C will be more easy than in chamber D, the equalizing provision is directed to prevent any greater pressure in said chamber C. Should the pressure in this chamber increase from any cause, the division or diaphragm will move into the chamber D, drawing the valve $b$ with it in the direction of the arrow P, partially closing the inlet-ports $d$, and allow the pressure to become equal again. The pressure in the chamber being thus always made equal, the quantity of the water discharged from each chamber will depend on the size of the discharge-orifices $m$ and $n$, and since they discharge into the same passage the quantities will bear a fixed relation to each other, and hence the sum of the discharges will be indicated by the indicating device operated by one of the divided streams of water. The direction of the flow of the water may be reversed, in which case the valve would be operated to prevent the too rapid escape of the water from the chamber C.

It will be understood that the indicating mechanism must be so adjusted that while indicating only a small portion of the passing water it will show the entire quantity of which the given portion entering the meter is measured.

The advantages of measuring a part only of the whole volume passing through a meter to give the sum total of the whole are, that it admits of the use of more sensitive indicating mechanism, effects more accurate measuring, and permits the use of a comparatively small meter for a large supply of water.

The invention embraced in the method which I have described is not claimed herein, as such matter forms the subject of a separate and distinct application for a patent filed by me of even date herewith.

I claim—

1. The combination, in a water-measuring device, of independent receiving-chambers, with a dividing-partition for said chambers capable of moving or yielding under pressure, a valve operated by said division to control the supply to one of said chambers by any difference of pressure which may exist therein, and suitable indicating mechanism, connecting with one of the chambers, substantially as described, for the purpose specified.

2. The combination, in a water-measuring device having independent receiving and discharging chambers, with a flexible dividing-diaphragm, a valve connected therewith for controlling the supply to one of said chambers, and suitable indicating mechanism operated by the flow through the other of said chambers, substantially as described, for the purpose specified.

3. The combination, with the shell A and the end cover, B, of flexible diaphragm $i$, forming the receiving and discharging shell, chambers C and D, the valve $b$, and the metered passage F, the said valve arranged and controlled by the movement of said chamber-forming diaphragm, in the manner herein set forth.

4. The combination, in a water-measuring device, of a shell having a receiving and discharging chamber with a partition forming said chambers capable of moving or yielding under the pressure, and a valve controlled by said partition, one chamber being supplied through a metered passage, and the other supplied through a valve operated by the difference of pressure within said chambers, substantially as described, for the purpose stated.

5. The combination, in a water-meter, of two chambers having separate inlet and outlet orifices, with an indicating device operated by the flow through one inlet, a valve placed in the other inlet, and a partition dividing said chambers, connected with said valve and operated to control it to equalize the pressure in said chambers whenever unequal pressure is produced therein, substantially as described.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.